United States Patent [19]

Vezain et al.

[11] Patent Number: 5,082,212
[45] Date of Patent: Jan. 21, 1992

[54] TORQUE LIMITER DEVICE AND DEPLOYABLE LENGTHENING PIECE OF A SPACE INSTRUMENT EQUIPPED WITH THIS DEVICE

[75] Inventors: Gérard Vezain, Mandelieu; Jacques Auternaud, Mougins; Daniel Viale, Fayence, all of France

[73] Assignee: Societe Nationale Industrielle et Aerospatiale, Paris, France

[21] Appl. No.: 691,345

[22] Filed: Apr. 25, 1991

[30] Foreign Application Priority Data

May 17, 1990 [FR] France .................. 90 06171

[51] Int. Cl.$^5$ .............................................. B64G 1/44
[52] U.S. Cl. ..................................................... 244/173
[58] Field of Search ............... 244/173; 160/188, 193, 160/213, 209, 206, 183; 267/160, 164, 154, 273, 283, 284; 403/146, 145, 121

[56] References Cited

U.S. PATENT DOCUMENTS

| 4,030,102 | 6/1977 | Kaplan et al. | 244/173 |
| 4,296,791 | 10/1981 | Chaumat et al. | 160/206 |
| 4,393,541 | 7/1983 | Hujsak et al. | 244/173 |

FOREIGN PATENT DOCUMENTS 2635077  2/1990  France .

Primary Examiner—Joseph F. Peters, Jr.
Assistant Examiner—Anne E. Bidwell
Attorney, Agent, or Firm—Pearne, Gordon, McCoy & Granger

[57] ABSTRACT

So as to dampen the shock occuring at the end of deploying a deployable lengthening piece of a space instrument, such as a solar generator, without resorting to using a complex speed regulation or synchronization mechanism for deployment, the present invention offers a torque limiter device (28a) to be placed between each joint (12) and at least one of the adjacent elements (10a) of the lengthening piece. This device includes an elastic system, such as a stack of Belleville washers (48a) which presses the plate (24a) of the joint against the edge of the element (10a) with a predetermined and preferably adjustable force. At the end of deployment, this elastic system absorbs the energy of the shock by deforming, then it brings the two pieces (24a, 10a) back into contact with each other thus giving the lengthening piece with the desired rigidity. An accurate relative positioning is then ensured by a flexible plate (34a) whose lateral edges are secured to each of the pieces.

9 Claims, 3 Drawing Sheets

TORQUE LIMITER DEVICE AND DEPLOYABLE LENGTHENING PIECE OF A SPACE INSTRUMENT EQUIPPED WITH THIS DEVICE

FIELD OF THE INVENTION

The invention concerns a torque limiter device intended to be mounted on a deployable lengthening piece of a space instrument, such as on a satellite solar generator. The invention also concerns a deployable lengthening piece including one or several torque limiter devices.

BACKGROUND OF THE INVENTION

Space instruments, such as satellites, are usually equipped with a certain number of deployable lengthening pieces, such as solar generators, antenna reflectors, poles, etc. Throughout the satellite launching phase, these lengthening pieces are kept in a folded back position so as to firstly reduce the spatial requirement, and secondly avoiding damaging them. The keeping of the lengthening pieces in this folded back position in ensured by stacking devices constituted, for example, by bolts traversing the various panels constituting each solar generator.

When the satellite is placed into orbit, pyrotechnic shears are triggered so as to cut the stacking bolts and free the solar generators or any similar lengthening pieces. The actual deployment is then ensured by elastic members mounted on hinges which each connect the panels of the solar generator.

In conventional joints, these elastic means are constituted by torsion springs which exert between adjacent panels a relatively high deployment torque. So as to ensure that too large shocks do not occur at the end of deployment, the deployment speed of the panels is therefore adjusted, most frequently by synchronizing the deployment of the various panels constituting the solar generators, as shown in particular in the document FR-A-2 371 343.

The document FR-A-2 635 077 describes a different type of joint in which the elastic means are constituted by preformed elastic strips with an arc of a circle section which generate a known deployment torque and which may be relatively slight. Furthermore, any friction is virtually eliminated by the fact that the joint includes two braces which roll off onto each other by being guided by flexible metallic plates on which a traction prestressing is exerted.

The original design of this latter joint generally makes it possible to suppress any system for regulating the deployment speed and synchronization of deployment of the various panels in relation to one another. However, in the case of large solar generators needing to support, once deployed, orbital torques requiring a particularly high minimum rigidity, the absence of any regulation and synchronization may result in an extremely high shock (corresponding, for example, to a torque of 220 Nm) when locking the panels at the end of deployment. In fact, the forces generated at the time of locking are that much more significant when the rigidity of the deployed lengthening piece is high. If it is too high, this locking shock may damage the lengthening piece and render it unusable.

SUMMARY OF THE INVENTION

The object of the invention is to provide a torque limiter device designed in such a way as to be able to be used in association with any type of joint, and especially the type of joint described in the document FR-A-2 635 077, so as to limit the locking shock whilst ensuring the desired rigidity of the deployed lengthening piece and a relative accurate positioning of the various elements of the latter without it being necessary to resort to using complex synchronization or regulation mechanisms.

In accordance with the invention, this result is obtained by using a torque limiter device designed to be mounted in a deployable lengthening piece of a space instrument between one element of this lengthening piece and an adjacent joint, wherein it includes elastic recall means applying with a predetermined force a contact surface of said element against a contact surface of a plate of said joint, and positioning means ensuring a relative constant positioning of said surfaces in relation to one another when they come back to abut against each other under the action of the elastic recall means following a relative separation between these surfaces.

A device designed in this way makes it possible to reduce the torque supported by the joint at the time of locking at the end of deployment from 220 Nm to about 70 Nm. Moreover, it ensures a relative accurate and reproducible positioning of the various elements of the deployed lengthening piece, whilst guaranteeing the minimum rigidity required for the latter.

Advantageously, adjustment means are associated with the elastic recall means so as to allow for adjustment of the predetermined force applied by these elastic recall means (force which determines the separation of the two surfaces).

In one preferred embodiment of the invention, these elastic recall means are prestressed elastic means, such as a stack of elastic washers mounted on at least a rod traversing aligned holes formed in the two pieces constituted by said element and said plate, the elastic prestressed means being compressed between two support surfaces opposite each other formed on the rod and on the first of said pieces, whereas the rod takes support on a third support surface formed on the second piece.

Again, in this preferred embodiment, the positioning means include at least one flexible plate whose opposing lateral portions, oriented parallel to a hinge pin, are respectively secured to said element and the plate, for example by at least two adjusted screws.

Advantageously, each of the opposing portions of the flexible plate is ended by a cutoff edge which improves the rigidity of the plate in its fixing zone.

The object of the invention is to also provide a deloyable lengthening piece of a space instrument and including at least two elements interconnected by a joint, characterized by the fact that a torque limiter device, such as the one defined previously, is placed between each joint and at least one of the adjacent elements.

BRIEF DESCRIPTION OF THE DRAWINGS

One preferred embodiment of the invention is now to be described, given by way of non-restrictive example, with reference to the accompanying drawings on which.

DETAILED DESCRIPTION OF THE PREFERRED EMBODIMENTS

Figure 1:
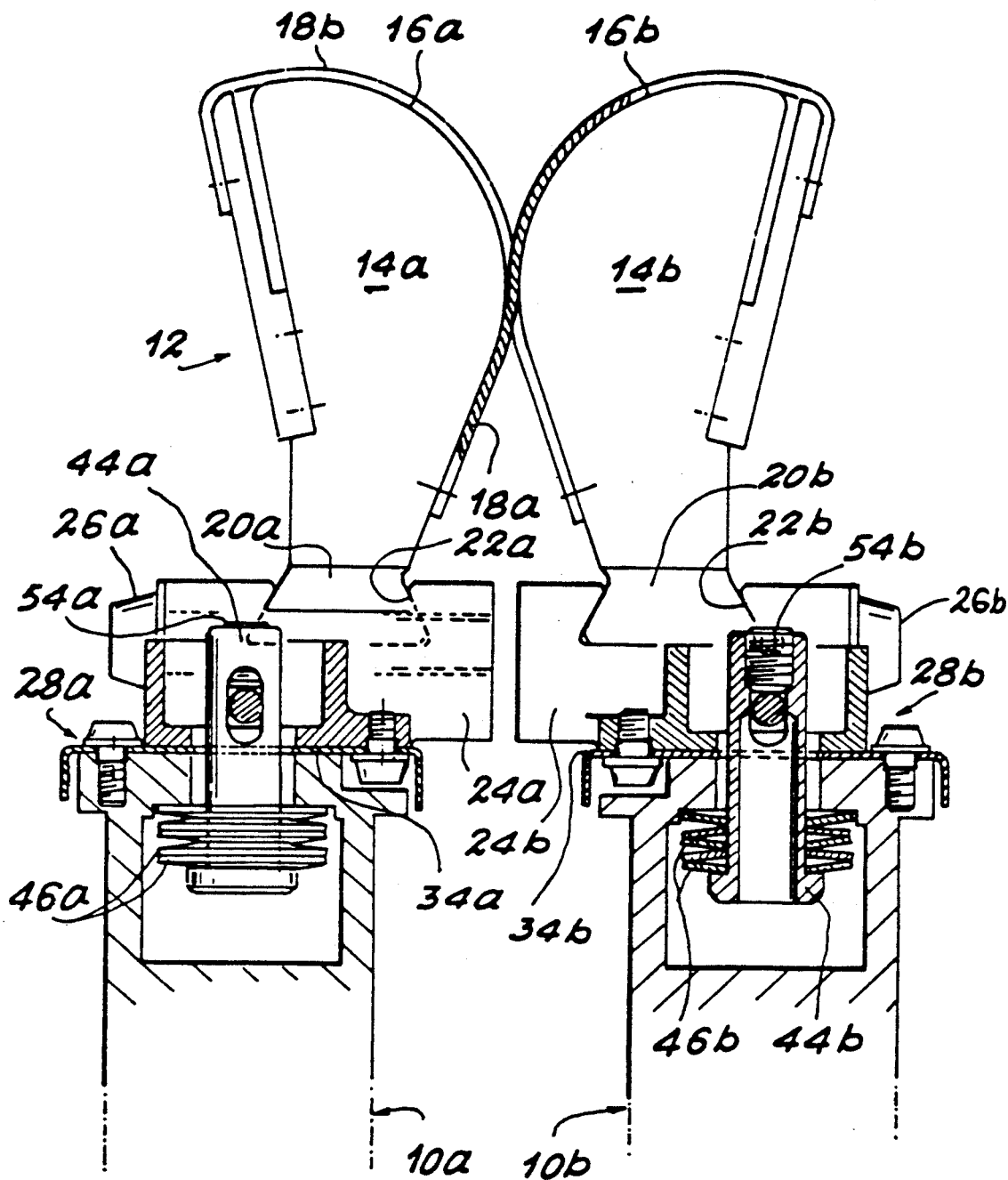
FIG. 1 is a transversal cutaway view showing a joint secured to two adjacent panels of a satellite solar generator by means of the torque limiter devices of the invention.

On FIG. 1, the references 10a and 10b denote two consecutive panels of a solar generator borne by a satellite. These panels 10a and 10b are shown in their stacking position they occupy until orbiting of the satellite. In this position, the panels (which may number more than two) are folded back against one another and orientated parallel to one another.

The adjacent edges of the panels 10a and 10b are connected by a joint, generally denoted by the reference 12. In the embodiment shown, this joint is embodied in accordance with the instructions contained in the document FR-A-2 635 077. For a more detailed description of this joint, reference should be made to this document.

In accordance with the instructions of this document, the joint 12 includes two braces 14a and 14b having adjacent cylindrical surfaces 16a and 16b able to roll against each other by being guided in this rolling movement by flexible metallic plates 18a and 18b, which may number four. These metallic flexible plates are placed between the surfaces 16a and 16b and disposed in such a way as to cross between the braces, the extremities of each of the plates being respectively secured to each of the braces, as shown on the figure. Means (not shown) are able to exert on each of the flexible metallic plates 18a and 18b a traction prestressing preventing separation of the braces at the time they roll onto each other.

Preformed elastic strips (not shown) are also secured via their extremities to the braces 14a and 14b so as to exert between the latter, when the solar generator is folded back, a turning moment which controls the automatic deployment of the joint 12. The elastic strips also ensure locking of the joint in the deployed position. The section of these elastic strips has the shape of an arc of a circle and these strips are secured to the braces so as to exhibit a rectilinear shape when the panels 10a and 10b are aligned at the end of deploying the solar generator.

In the embodiment shown on the figures, each of the braces 14a and 14b comprise a heel 20a and 20b with a round tail-shaped section received in a complementary groove 22a, 22b formed in a plate 24a, 24b. Each of the plates 24a and 24b is advantageously embodied by two portions connected by screws 26a, 26b, which facilitates mounting and dismounting of the braces 14a and 14b.

In accordance with the invention, the plates 24a and 24b are mounted on the adjacent extremity edges of the panels 10a and 10b by torque limiter devices, generally denoted by the references 28a and 28b on FIG. 1. It is to be noted that in certain cases, one of these torque limiter devices may be suppressed and the corresponding plate be directly secured to the adjacent panel.

As the two torque limiter devices 28a and 28b are identical, only one of them shall now be described in more detail with reference to FIG. 2, which more specifically shows the device 28a by which the plate 24a bearing the brace 14a is secured to the panel 10a.

On the side orientated towards the panel 10a, the plate 24a comprises a plane contact surface 30a. Similarly, the edge of the panel 10a orientated towards the plate 24a defines a plane contact surface 32a. A flexible plate 34a, generally plane and rectangular, is placed between these contact surfaces 30a and 32a, the opposing lateral portions of this flexible plate orientated parallel to the hinge pin 12 (that is in this instance to the generating line common to the surfaces 16a and 16b) being respectively secured to the panel 10a and the plate 24a. More specifically, the lateral portion of the flexible plate 34a furthest from the panel 10b (FIG. 1) is secured to the contact surface 32a of the panel 10a, whereas the lateral portion of the flexible plate 34a closest the panel 10b is secured to the plate 24a.

The securing of each of the two lateral portions of the flexible plate 34a respectively to the panel 10a and to the plate 24a is embodied with the aid of at least two screws 36a. These screws are preferably adjusted screws, in other words the adjacent portions at their head are calibrated cylindrical portions received in corresponding calibrated holes formed in the flexible plate 34a, in the panel 10a and in the plate 24a. When the plate is at rest and occupies a completely flat position between the contact surfaces 30a and 32a, this disposition makes it possible to guarantee a particularly accurate relative positioning between the panel 10a and the plate 24a along two orthogonal directions contained in the parting plane between the panel 10a and the plate 24a. The flexible plate 34a thus constitutes a relative positioning device between the contact surfaces 30a and 32a.

Figure 2:
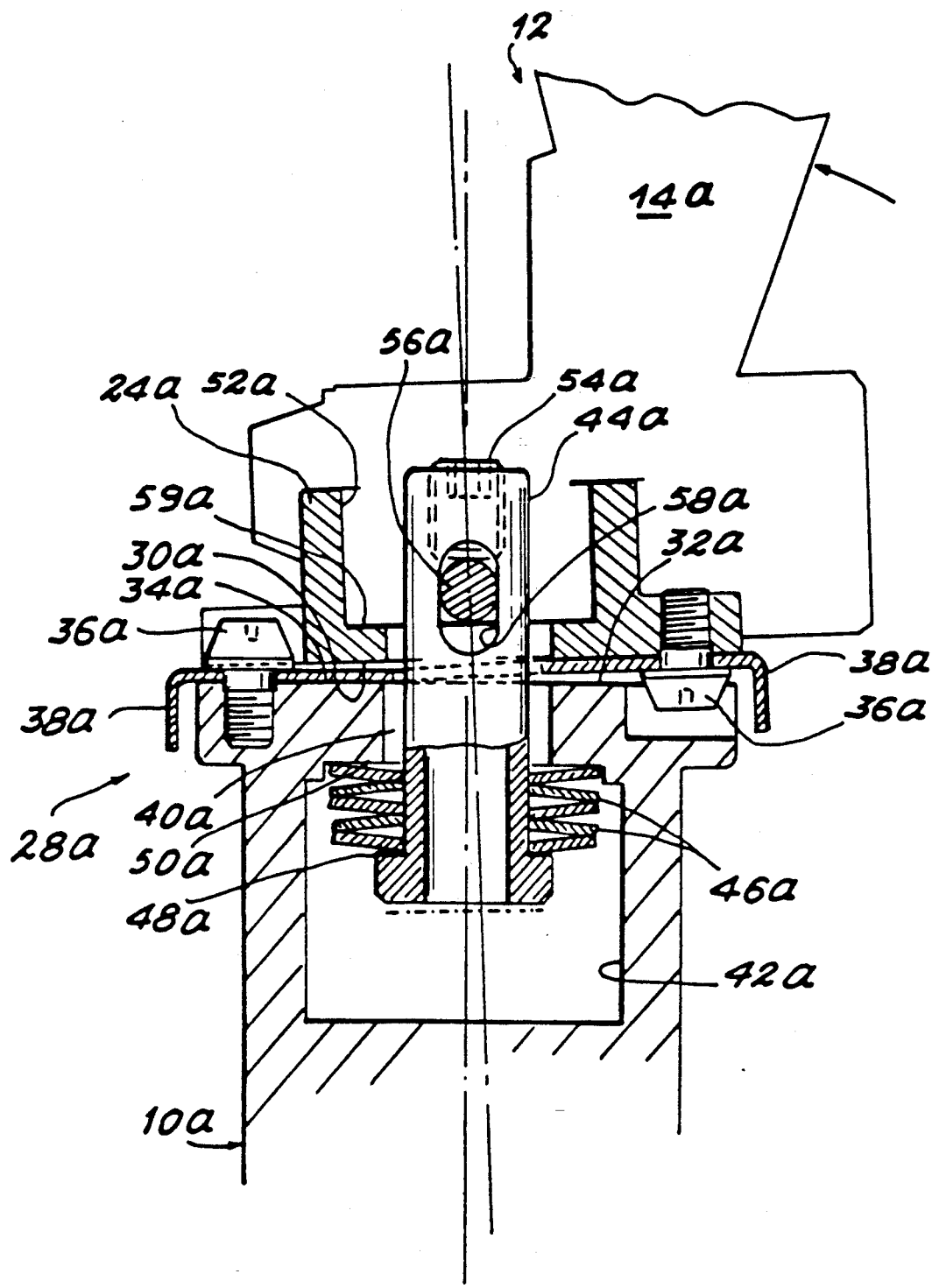
FIG. 2 is a cutaway view similar to that of FIG. 1 and illustrating on larger scale one of the torque limiter devices by which the joint is mounted on the panels.

As also shown on FIG. 2, hollow portions are advantageously formed in the panel 10a and the plate 24a so as to receive the heads of the screws 36a via which the flexible plate 34a is secured to these two pieces.

Furthermore, the edges of the opposing lateral portions of the flexible plate 34a, respectively fixed into the panel 10a and the plate 24a, are folded back at a right angle beyond the faces of the panel 10a so as to form cutoff edges 38a. These cutoff edges 38a make it possible to ensure that the flexible plate 34a does not deform close to the fixing screws 36a when the plate is subjected to end of deployment stresses.

Along a direction perpendicular to the plane of FIG. 2, the plate 24a, the flexible plate 34a and the panel 10a are traversed by aligned holes 40a which open into a recess 42a inside the panel 10a. Each of these aligned holes 40a receives a cylindrical rod 44a, a stack of elastic washers 46a, such as Belleville washers, being placed on this rod inside the recess 42a. More specifically, these elastic washers 46a are placed between a shoulder 48a formed close to the extremity of the rod 44a received in the recess 42a and a support surface 50a formed around the hole 40a in the recess 42a.

The opposing extremity of the cylindrical rod 44a, which projects into one hollow portion 52a of the plate 24a, comprises along its axis a tapped hole in which a set screw 54a is received. The extremity of this screw 54a is in support on a support bar 56a which radially traverses the rod 44a through an oblong opening 58a elongated along the axis of the rod 44a. More specifically, the support bar 56a radially traverses all the rods 44a received in the aligned holes 40a and is in support on a support surface 59a constituted by the bottom of the hollow portion 52a of the plate 24a.

By means of the disposition described above, it can be readily understood that by screwing the set screw 54a into each of the rods, it is possible to adjust at will the prestressing stored in the stack of elastic washers 46a mounted on this rod. The stack of elastic washers 46a thus constitutes an elastic recall device making it possible to apply with a predetermined plating force the contact surface 32a of the panel 10a against the contact surface 30a of the plate 24a through the flexible plate 34a. This plating force gives the deployed lengthening piece the required rigidity and determines the maximum torque which may be transmitted through the device 28a without the latter deforming.

Of course, the number of elastic washers 46a placed on each of the rods 44a, as well as the number of rods mounted between the plate and the corresponding panel, may be modified so as to be able to increase or reduce the plating force exerted by the device of the invention. The only limit to these two numbers is determined by the place available, which may not be increased endlessly.

Figure 3C:
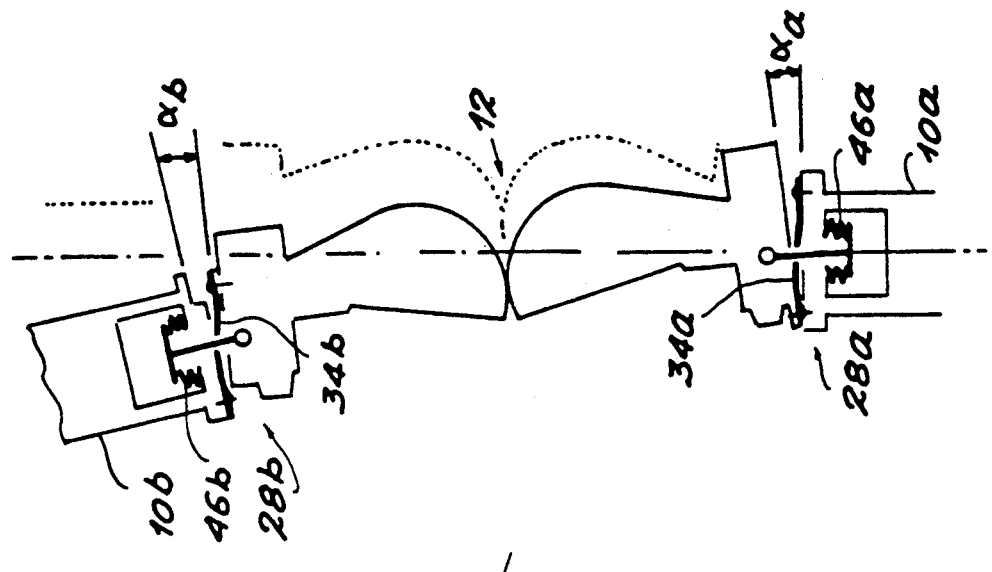
FIGS. 3A to 3C are diagrammatic cutaway views similar to the view of FIG. 1 and illustrating three successive stages for the deployment of a solar generator whose joints are equipped with the torque limiter devices of the invention.
Figure 3B:
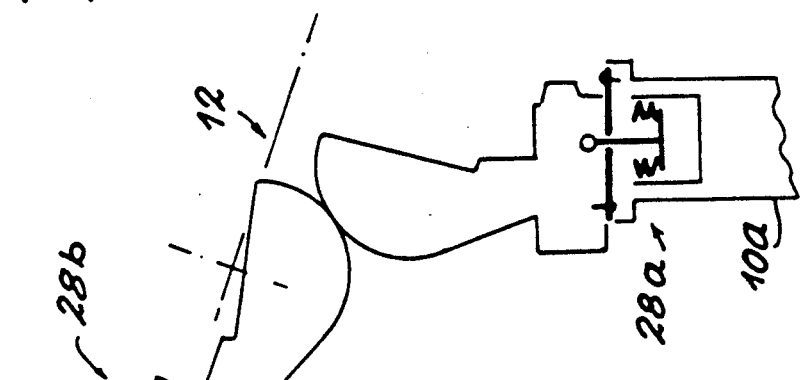
Figure 3A:
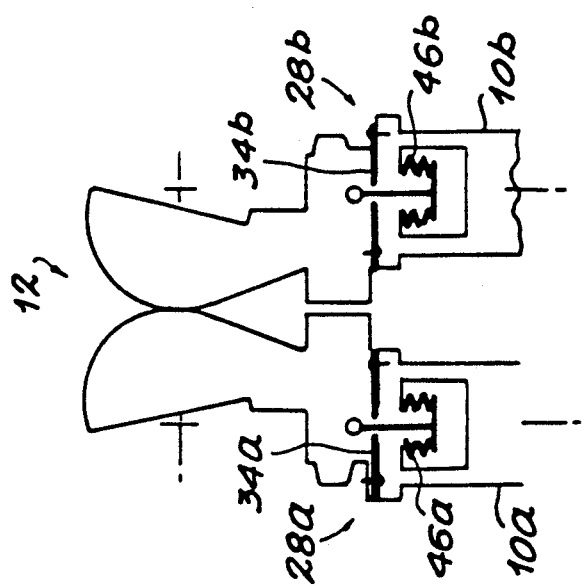

As already mentioned with reference to FIG. 1 and as also shown diagrammatically on FIG. 3A, the panels 10a and 10b occupy, at the moment of launching and until the satellite in placed into orbit, approximately parallel folded back positions. In these conditions, the torque limiter devices 28a and 28b do not play any role, in other words the plates of the joint 12 are applied against the edges of the panels 10a and 10b under the action of the prestressing stored in the elastic washers 46a and 46b.

Once orbiting has been completed, the stacking mechanisms of the solar generator are freed, generally effected by a pyrotechnic device, so that the solar generator starts to be deployed via the action of the elastic strips (not shown) of the joint 12. This deployment phase is shown diagrammatically on FIG. 3B. It has no effect on the torque limiter devices 28a and 28b which remain in the previously described positions.

At the end of deployment and as shown on FIG. 3C, the joint 12 is immediately locked under the action of the elastic strips (not shown) so than any shock, which might be relatively large, is transmitted to the panels 10a and 10b by means of the torque limter devices 28a and 28b. The flexible plates 34a and 34b, which are relatively flexible, then allow the contact surfaces of the joint 12 and of the panels 10a and 10b to separate in a pivoting movement which prolongs the deployment movement of the solar generator beyond the final alignment position of the panels. This pivoting movement, shown by the angles aa and ab for the devices 28a and 28b on FIG. 3C, has the effect of compressing the stackings of the elastic washers 46a and 46b absorbing the energy of the shock. The maximum torque, supported by the plates of the joint and the panels, is proportional to the maximum force then exerted by the stackings of the elastic washers and to the arm of their lever separating the point for applying this force from the pivoting point of the contact surfaces 32a and 34a.

The stackings of elastic washers 46a and 46b instantly recall the panels 10a and 10b of the joint 12 to their final alignment position around which all these pieces are able to oscillate several times before reaching this position under the effect of dampening of the system, mainly due to friction. The rigidity of the stackings of elastic washers 46a and 46b is then-able to ensure rigidity of the entire deployed solar generator satisfying the desired objectives.

Moreover, the reproducibility of the relative positioning between the deployed panels is ensured with great precision by the flexible plates 34a and 34b which are found squeezed in a static position between the plates of the joint and the adjacent edge of each of the panels.

The torque limiter devices of the invention thus make it possible to absorb one portion of the energy which would normally be supported by the various pieces constituting the solar generator at the time of locking the joints in a deployed position, whilst preserving the rigidity of the solar generator unit and an accurate and reproducible alignment of the various panels constituting said generator.

Of course, the invention is not merely limited to the embodiment described above by way of example, but covers all possible variants.

Thus, it ought to be mentioned that firstly if the torque limiter device of the invention is particularly adapted so as to be placed between the various panels and the joints of a satellite solar generator, it may be used in the same way on any deployable lengthening piece of a space instrument, such as an antenna reflector, pole, etc. In addition, the torque limiter device of the invention may be used irrespective of the nature of the joint connecting the various elements of the deployable lengthening piece, and each joint may be associated with one or several of these devices, depending on the amount of energy to be absorbed at the end of deployment and the energy it is possible to absorb with a device according to the volume allocated to it.

In addition, the torque limiter device may be embodied differently, the stackings of elastic washers being able to be replaced by helical compression springs or by hydraulic or pneumatic dampers.

Similarly, the flexible plates, which ensure a constant and reproducible relative positioning of the various elements of the deployed lengthening piece, may be replaced by technically equivalent positioning means, such as complementary guiding surfaces formed respectively on the plates and on the adjacent edges of the elements of the lengthening piece, so as to bring these two pieces automatically back into a relative accurate position at the end of the oscillation movement occuring at the time of locking at the end of deployment. The flexible plate solution is preferred as it ensures a real mechanical link between the two pieces and suppresses any friction, as well as any risk of blocking in a position differing from the final sought-after position.

The flexible plate may also be replaced by several similar flexible plates whose opposing lateral portions are secured at at least two points to each of the pieces. Each of the devices may include several flexible plates secured crosswise to each of the pieces, which makes it possible to guarantee that at least one of the plates works on traction irrespective of the direction of the relative pivoting between the plate and the adjacent element of the deployable lengthening piece. The behaviour on buckling of the flexible plates is thus improved, especially when these plates are subjected to extremely high shearing loads in both directions.

The securing of each of the plates to the two pieces may also be effected differently, the positioning and fixing able to be effected separately by using conventional fixing screws and centering slugs received in adjusted holes.

Finally, any structure making it possible to apply the two pieces against each other via the action of stacking of the elastic washers or any equivalent elastic device may differ from the structure defined, the same applying as regards the means for adjusting the prestressing of these elastic means which may in certain cases be suppressed or replaced by technically equivalent means.

What is claimed is:

1. Torque limiter device designed to be mounted on a deployable lengthening piece of a space instrument between one element of this lengthening piece and an adjacent joint, wherein this device includes elastic recall means applying with a predetermined force a contact surface of said element against a surface contact of a plate of said joint, and positioning means ensuring a relative constant positioning of said surfaces with respect to one another when they return to abut against one another via the action of the elastic recall means following a relative separation between these surfaces.

2. Device according to claim 1, wherein the elastic recall means are associated with means for adjusting said predetermined force.

3. Device according to claim 2, wherein the elastic recall means are prestressed elastic means mounted on a rod traversing aligned holes formed in the two pieces constituting said element and said plate, said prestressed elastic means being compressed between two support surfaces opposite each other formed on said rod and on the first of said pieces, whereas the rod takes support on a third support surface formed on the second piece.

4. Device according to claim 3, wherein the prestressed elastic means are mounted on one extremity portion of the rod housed in a recess formed in said element, the adjustment means including one screw received in a tapped hole formed axially in the opposing extremity of the rod, said screw taking support on a support bar which traverses a radial hole formed in said rod so as to apply this support bar against the third support surface.

5. Device according to claim 3, wherein the elastic prestressed means include a stack of elastic washers.

6. Device according to claim 1, wherein the positioning means include at least one flexible plate whose two opposing lateral portions orientated parallel to a hinge pin are secured to said element and to the plate respectively.

7. Device according to claim 6, wherein each of said opposing portions of the flexible plate is fixed by at least two adjusted screws.

8. Device according to claim 6, wherein each of said opposing portions of the flexible plate is ended by a cutoff edge.

9. Deployable lengthening piece of a space instrument and including at least two elements interconnected by a joint, wherein a torque limiter device is placed between each joint and at least one of the adjacent elements, this device including elastic recall means applying with a predetermined force a contact surface of said element against a contact surface of a plate of said joint, and positioning means ensuring a relative constant positioning of said surfaces with respect to one another when they return to abut against one another via the action of the elastic recall means following a relative separation between these surfaces.

* * * * *

UNITED STATES PATENT AND TRADEMARK OFFICE
CERTIFICATE OF CORRECTION

PATENT NO. : 5,082,212

DATED : January 21, 1992

INVENTOR(S) : Gerard Vezain, et al.

It is certified that error appears in the above-identified patent and that said Letters Patent is hereby corrected as shown below:

On the title, item (73) Assignee: "Societe Nationale Industrielle Aerospatiale" should be --Aerospatiale Societe Nationale Industrielle--.

Signed and Sealed this

Seventh Day of September, 1993

Attest:

BRUCE LEHMAN

Attesting Officer
Commissioner of Patents and Trademarks